United States Patent [19]

Ewald

[11] 4,182,427

[45] Jan. 8, 1980

[54] CONTROL MECHANISM FOR AN INTEGRATED BRAKE AND STEERING SYSTEM

[75] Inventor: Jerome T. Ewald, South Bend, Ind.

[73] Assignee: The Bendix Corporation, Southfield, Mich.

[21] Appl. No.: 832,135

[22] Filed: Sep. 12, 1977

[51] Int. Cl.² .............................................. B62D 5/08
[52] U.S. Cl. ...................................... 180/148; 60/548; 60/555; 91/625.17
[58] Field of Search ...................... 180/148, 132, 77 H, 180/77 HT; 137/625, 17; 60/548, 555, 386; 91/412, 391

[56] References Cited

U.S. PATENT DOCUMENTS

| 1,748,041 | 2/1930 | Bachus | 180/77 H |
|---|---|---|---|
| 2,766,834 | 10/1956 | Boyer | 180/19 H |
| 2,949,971 | 8/1960 | Cline | 137/625.17 X |
| 3,677,362 | 7/1972 | Chatterjea | 180/6.48 |
| 3,838,629 | 10/1974 | Meyers | 91/391 |

*Primary Examiner*—John A. Pekar
*Attorney, Agent, or Firm*—Leo H. McCormick, Jr.; Ken C. Decker

[57] ABSTRACT

A control mechanism through which pressurized fluid from a source is communicated into a brake system and a steering system in response to independent operator brake and steering signals. The control mechanism has a housing with a first bore and a second bore therein. A piston located in the first bore separates a first chamber and a second chamber. A spool valve located in the second bore separates a brake pressure chamber created therein from a series of lands that control the flow of the pressurized fluid through the housing. When an operator effects a brake application, the piston moves in the first bore and creates a brake pressure in the first chamber. The brake pressure which is communicated to the brake pressure chamber in the second bore linearly moves the spool valve and allows pressurized fluid to be communicated to the second chamber in the first bore. The pressurized fluid in the second chamber acts on the piston and provides a power assist to aid in the development of the brake pressure during a brake application. When an operator turns the steering wheel of the vehicle, rotary torque is transmitted through an input shaft to a torsion member connected to a pinion which engages a rack in the steering system. Rotation of the input shaft causes a restriction in the flow of the pressurized fluid from the housing to a piston attached to the rack in the steering gear. The restricted flow causes a pressure differential to be created across the piston to provide a power assist in moving the rack. The movement of the rack is transmitted to rotate the spool valve to eliminate the restrictive flow condition and the pressure differential so that the rack is maintained in a position corresponding to the position of the vehicle steering wheel.

29 Claims, 10 Drawing Figures

CONTROL MECHANISM FOR AN INTEGRATED BRAKE AND STEERING SYSTEM

BACKGROUND OF THE INVENTION

Hydraulic brake boosters, such as disclosed in U.S. Pat. No. 3,831,491, have been proposed for general use in vehicles because of their compactness and reliability. In such brake boosters, the input force from the operator, which is modified through a ratio changer, moves a valve to allow a proportional volume of fluid under pressure to actuate the wheel brakes of the vehicle.

In order to maintain the number of components attached to the drive train of the motor of the vehicle at a minimum, it was suggested, as disclosed in U.S. Pat. No. 3,838,629, that a portion of the output of the pump that supplies the power steering gear be diverted to operate the hydraulic brake booster.

In a further effort to better utilize the space available under the hood of vehicles, my U.S. patent application 670,513, now U.S. Pat. No. 4,072,011, discloses a single structure for retaining both a hydraulic brake booster and a power steering gear. A flow control valve in the housing in response to a brake actuation signal diverts a portion of the output of the pump away from the rotary valve in the steering gear to provide the hydraulic brake booster with a power assist.

SUMMARY OF THE INVENTION

I have now devised a control mechanism having a rotary valve for controlling the communication of pressurized fluid from the pump to both the hydraulic brake booster and steering gear in response to corresponding a brake and/or steering signals.

The control mechanism has a housing with a first bore and a second bore located therein. A piston located in the first bore cooperates with the housing to establish a first and second chamber therein on opposite ends of the piston. A spool valve located in the second bore cooperates with the housing to establish a brake pressure chamber therein. The spool valve has a series of lands on the peripheral surface thereof for controlling the flow of fluid under pressure from the pump along first and second flow paths to a piston in the steering gear, to the second chamber in the first bore and to a return passage connected to a reservoir in the pump. A brake linkage connects the piston in the first bore with a brake pedal. A steering shaft concentric to the spool valve is connected through a torsion bar to a pinion which engages a rack in the steering gear. One end of the pinion is retained in a bearing in the steering gear housing while the other end is connected to the spool valve.

An input force from an operator applied to the brake pedal to effect a brake application moves the piston in the first bore and creates a brake pressure for operating the brake system. The brake pressure is communicated to the brake pressure chamber and linearly moves on the spool valve to allow a proportional quantity of fluid under pressure to flow to the second chamber. The fluid under pressure in the second chamber acts on the piston to provide an assist in moving the piston and create an operational brake pressure. This assist continues for the duration of the input force.

An operator steering or turn signal is transmitted through the steering shaft, through the torsion bar and into the pinion for moving a rack which is connected to the wheels of the vehicle. Rotation of the steering shaft relative to the spool valve restricts the flow of fluid under pressure from the source between the return passage and one of the first and second flow paths to a piston in the steering gear. The restricted flow through one of the first and second flow paths causes a pressure differential to occur across the piston in the steering gear. The piston which is attached to the rack responds to the pressure differential and provides a power assist for moving the rack in the turning of the vehicle wheels. The pinion is connected to the spool valve and rotates the same to its original position relative to the steering shaft wherein the restrictive flow condition and thus the pressure differential is eliminated. When the pressure differential is eliminated, the rack is maintained in a position corresponding to the operator steering or turn signal.

It is therefore the object of this invention to provide a vehicle with a spool valve means for controlling the communication of fluid under pressure to provide a power assist in the operation of a brake system and a steering system in response to an independent operator brake and steering signals.

It is a further object of this invention to provide a control mechanism with a spool valve which moves along a linear path to regulate the distribution of a fluid under pressure to a brake system and in a rotary path to regulate the distribution of the fluid under pressure to a steering system.

It is another object of this invention to provide a housing for retaining a single control for simultaneously regulating the communication of fluid under pressure to provide an assist in the operation of independent brake and steering systems.

These and other objects should be apparent from reading this specification and viewing the drawings.

DETAILED DESCRIPTION OF THE INVENTION

Figure 1:
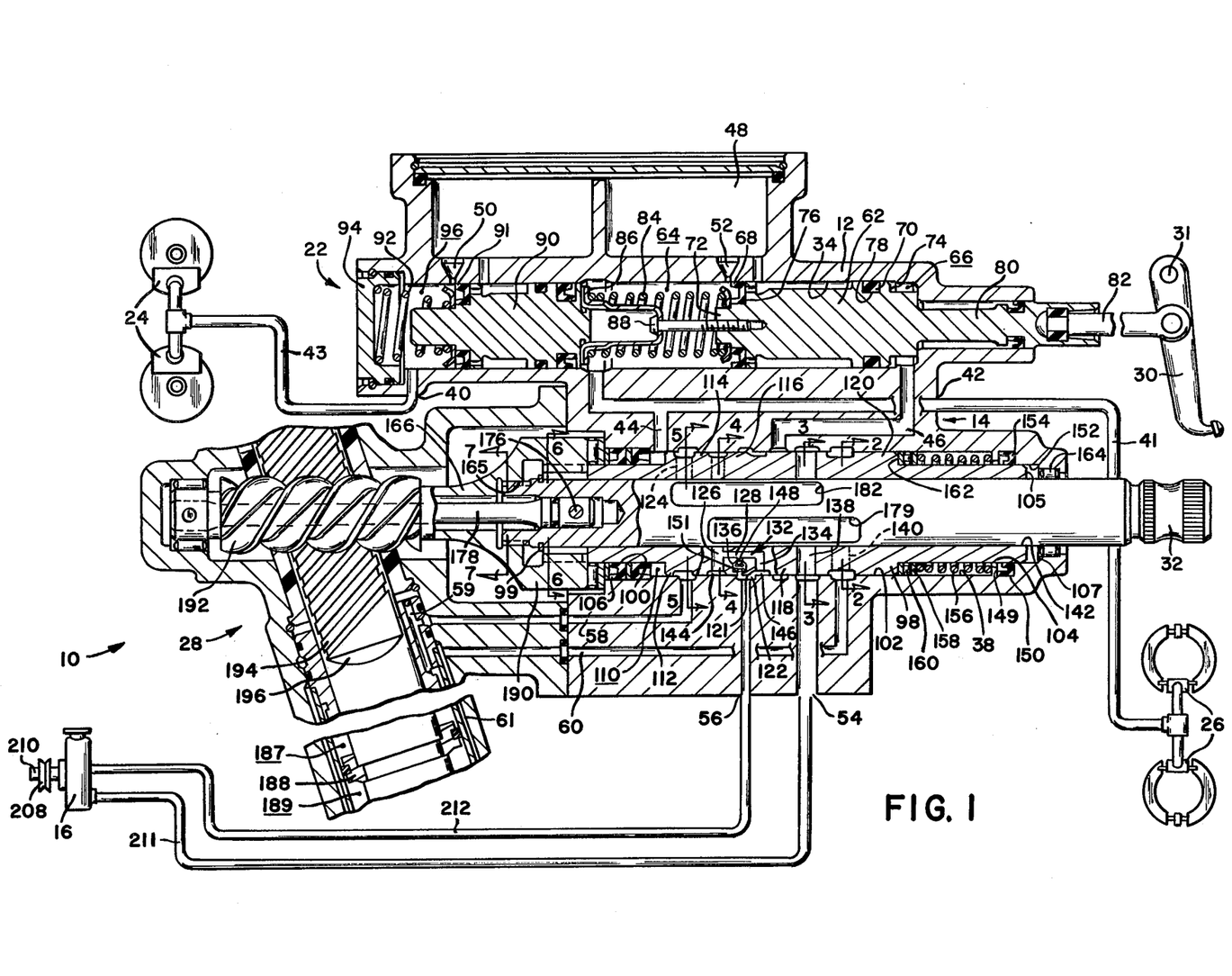
FIG. 1 is a schematic illustration of a common fluid brake and steering system for a vehicle, showing a sectional view of an integrated control made according to the teachings of this invention for regulating the distribution of a common pressurized fluid from a source to provide a power assist in the operation of the brake and steering system.

The common fluid brake and steering system 10 shown in FIG. 1 has a housing 12 for retaining a control mechanism 14 through which pressurized fluid from pump 16 is distributed to provide a power assist in the operation of a brake system and a steering system.

The brake system has a booster mechanism 22 connected to the front wheel brakes 24 and to the rear wheel brakes 26.

The steering system is connected to the front wheels associated with wheel brakes 24 through a rack and pinion steering gear 28 of the type fully disclosed in U.S. patent application 642,280 filed Dec. 19, 1975, now abandoned.

In response to an operator brake input to the brake pedal 30, the brake booster 22 is operated to effect a brake application. When operated, the brake booster produces a brake fluid pressure which activates the control mechanism 14 and allows communication of a corresponding fluid pressure from pump 16 to aid in the operation of the brake booster. If during this same period of time, the operator desires to turn the wheels of the vehicle, a steering input applied to shaft 32 is transmitted to the rack and pinion steering gear 28. The steering input causes a shaft 32 to rotate and activate control mechanism 14. Rotational activation of control mechanism 14 causes a pressure differential to occur in the fluid communicated to the rack and pinion steering gear 28. This pressure differential causes the rack to move and impart an assist in turning the wheels of the vehicle. The movement of the pinion by the rack is carried into the control mechanism 14 to proportionally reduce the pressure differential condition of the fluid to the rack so that the rack is maintained in a position corresponding to the steering or turn input signal as long as the operator maintains the steering or turn input signal.

In more particular detail the housing 12 of control mechanism 14 has a first bore 34 and a second bore 38 located therein. The first bore 34 is connected to the front wheel brakes 24 through port 40, to the rear wheel brakes 26 through port 42, to the second bore through a first and second internal passages 44 and 46, and to a reservoir 48 through compensator passages 50 and 52 in the housing 12. The second bore 38 is connected to the input of pump 16 through inlet passage 54, to a return passage 56 connected to a reservoir in pump 16 and to the power steering gear 28 through a first and second fluid paths or passages 58 and 60, respectively.

A first piston 62 located in the first bore 34 cooperates with the housing 12 to establish a first chamber 64 and a second chamber 66 adjacent ends 72 and 74 of the piston 62. A first seal 68 located on a shoulder 76 adjacent end 74 and a second seal 70 located in groove 78 of piston 62 prevent fluid communication between the first and second chambers 64 and 66 and the reservoir 48. The first piston 62 has a cylindrical projection 80 which extends through the houssng 12 for engagement with push rod or linkage 82 associated with brake pedal 30.

A caged spring 84 has a retainer 86 attached to the end 72 of the first piston 62 by a bolt 88. By adjusting the threaded connection of bolt 88 with respect to end 72, the size of the first chamber 64 can be varied to match the volumetric requirement of the rear wheels 26 in the brake system.

A second piston 90 is located in the first bore 34 in front of retainer 86. A return spring 92 located in bore 34 adjacent end plug 94 holds the second piston 90 against retainer 86 to establish a third chamber 96.

Arcuate movement of the brake pedal 30 is transmitted into linear movement through push rod or linkage 82. This linear movement causes the first and second pistons 62 and 90 to move in the first bore 34 and generate a brake pressure in the first and second chambers 64 and 96. This brake pressure is simultaneously communicated to the front brakes 24 through conduit 43 and to the rear brakes 26 through conduit 41.

The brake pressure developed in the first chamber 64 is communicated through passage 44 to operate that portion of the control mechanism 14 associated with the distribution and regulation of the flow of fluid from pump 16 for providing a power assist to the brake booster 22.

The control mechanism 14 in housing 12 which regulates the flow of the fluid from pump 16 includes a spool valve 98 which is located in the second bore 38. The spool valve 98 has sleeve with a first diameter 100, a second diameter 102, and a third diameter 104. A seal and bearing member 106 surrounds the first diameter section and cooperates with the sleeve to establish a brake pressure chamber 110 at the intersection of passage 44 and the second bore 38. The second diameter section 102 of the sleeve has a series of lands and associated radial passages thereon for directing the flow of fluid from pump 16 to the return passage 56.

In more particular detail, the sleeve has a first land 112 which separates the brake pressure chamber 110 from a first flow path or steering passage 58, a second land 114 that separates the first flow path or steering connection 58 from the return passage 56, a third land 116 for establishing a metering surface with the annular surface 122 surrounding the return passage 56, a fourth land 118 one end of which separates passage 46 from the return passage 56 and the other end of which separates inlet passage 54 and the return passage 56 from a second flow path or steering passage 60, and a fifth land 120 which separates the second flow path or steering passage from the third diameter of the sleeve.

Figure 5:
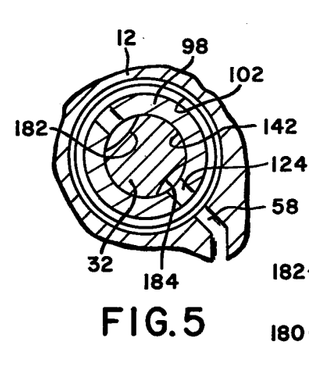
FIG. 5 is a sectional view taken along line 5—5 of FIG. 1.

A first radial bore 124, as best seen in FIG. 5, connects the interior bore 142 of the spool valve or sleeve 98 with the first flow path or steering passage 58.

Figure 4:
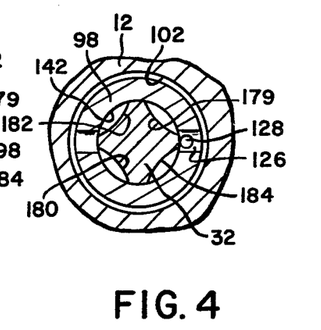
FIG. 4 is a sectional view taken along line 4—4 of FIG. 1.

A second radial bore 126, as best seen in FIG. 4 connects the interior bore 142 of the sleeve with annular groove 144 located between the second and third lands 114 and 116, respectively. An axial passage 128 connects radial bore 126 with a first blind radial bore 134 extending from groove 146 located between the third and fourth lands 116 and 118, respectively.

A second blind radial bore 136 extends from the third land into the axial passage 128.

A relief valve 132 has a ball 148 urged against a seal by a spring 151 to control the flow of fluid through the second blind radial bore 136.

Figures 2, 3:
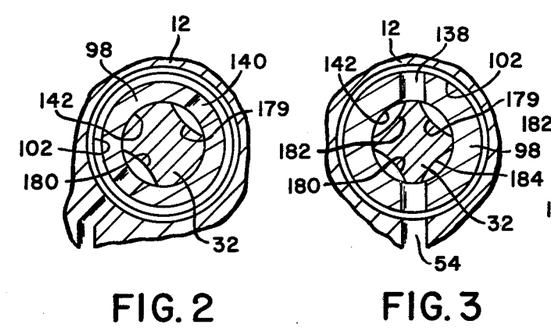
FIG. 2 is a sectional view taken along line 2—2 of FIG. 1.
FIG. 3 is a sectional view taken along line 3—3 of FIG. 1.

A third radial bore 138, as best seen in FIG. 3, connects the interior bore 142 with the outlet flow of fluid from pump 16 in passage 54.

A fourth radial bore 140, as best seen in FIG. 2, connects the interior bore 142 with the second flow path for steering connection 60.

The second bore 38 has an inwardly projecting annular surface 149 which establishes a groove 150 adjacent guide surface 152. A seal 154 located in groove 150 prevents communication of fluid along the second bore to the surrounding environment. A return spring 156 located between a retainer 158 and the annular surface 149 urges the spool valve or sleeve 98 toward the brake pressure chamber 110 as shown in FIG. 1. A needle bearing 160 located between shoulder 162 and retainer 158 allows the sleeve 98 to rotate without frictional resistance as could occur if spring 156 acted directly on the sleeve 98.

Figure 7:
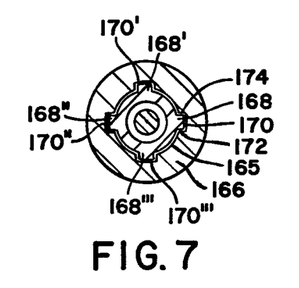
FIG. 7 is a sectional view taken along line 7—7 of FIG. 1.
Figure 8:
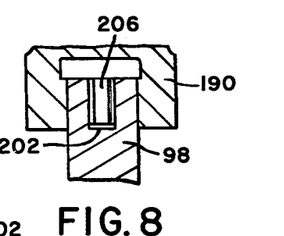
FIG. 8 is a sectional view taken along line 8—8 of FIG. 6.

The input shaft 32 which is aligned in bore 38 by bearing surface 164 in housing 12 extends through the interior bore 142 of the spool valve or sleeve 98 and is positioned in bore 165 on pinion 166 of the steering gear 28. As shown in FIG. 7, shaft 32 has a series of keys 168, 168', 168'', 168''' on the end thereof which are located in corresponding slots 170, 170', 170'', 170''' in the pinion 166. Gaps 172 and 174 located between the keys 168, 168', 168'' and 168''' and the walls of slots 170, 170', 170'' and 170''' prevent the engagement of shaft 32 with pinion 166 until a predetermined rotational torque is applied to pinion 166 through torsion bar 178 attached to shaft 32 by pin 176.

The shaft 32 has a first series of slots 179 and 180 and a second series of staggered slots 182 and 184, see FIGS. 1 and 3, located thereon adjacent radial bores 124, 126, 138 and 140 in the spool valve or sleeve 98. Slots 179 and 180 control the flow of fluid between the input passage 54 and radial bore 126 connected to the return passage 56 and radial bore 140 connected to the second flow path or steering passage 60. Whereas, slots 182 and 184 control the flow of fluid between the inlet passage 54 and radial bore 124 connected to the first flow path or steering connection 58.

Figure 6:
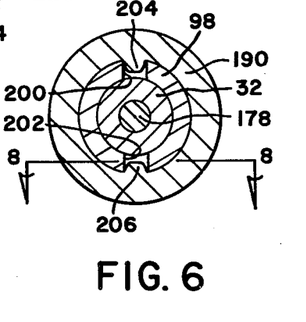
FIG. 6 is a sectional view taken along line 6—6 of FIG. 1.

Slots 179, 180, 182 and 184 are aligned with radial bores 124, 126, 138 and 140 to permit half of the fluid from inlet passage 54 to flow in slots 179 and 180 and half of the fluid to flow in slots 182 and 184 in the absence of an operator rotative torque to shaft 32. With equal flow and pressures in slots 179, 180, 182 and 184, piston 188 in the steering gear 28 remains stationary and fluid flow in steering passages 58 and 60 is stagnated. Thus, the flow of fluid from inlet passage 54 is directly communicated to the return passage 56 through radial bore 126, axial passage 128 and blind radial bore 134 and rack 196 remains stationary. A cylindrical section 190 of pinion 166 surrounds the end of the spool valve or sleeve 98, see FIG. 6, to maintain teeth 192 in alignment with teeth 194 on rack 196. Keys 204 and 206 on the cylindrical member 190 slide into slots 200 and 202 in the spool valve or sleeve 98 to transmit rotary motion from the pinion into the spool valve or sleeve and sustain the relationship between slots 179, 180, 182 and 184 and radial bores 124, 126, 138 and 140 even though sleeve 98 moves linearly in response to brake pressure to prevent the creation of a pressure differential across piston 188 in the steering gear during a brake application.

MODE OF OPERATION OF THE INVENTION

When the engine in a vehicle equipped with a brake and steering system 10 shown in FIG. 1 is operating, pully wheel 208 continually rotates shaft 210 in pump 16 to produce a source of fluid flow. The fluid flows from pump 16 through conduit 211 to inlet passage 54 in control mechanism 14. As best shown in FIGS. 1 and 3, fluid simultaneously flows from the inlet passage 54 into slots 179, 180, 182 and 184 for distribution to the first and second flow paths of steering passages 58 and 60 before being returned to return passage 56 for communication through conduit 212 to a reservoir in pump 16. This type of flow continues as long as shaft 210 in pump 16 is rotating.

When the operator desires to effect a brake application, an input force or brake signal is applied to brake pedal 30. This input force causes brake pedal 30 to rotate about pin 31 and impart a linear input force to push rod or master cylinder linkage 82. Initial movement of push rod or master cylinder linkage 82 moves seal 68 on piston 62 and seal 91 on piston 90 past compensator ports 52 and 50, respectively, to seal chambers 64 and 96 from reservoir 48. Thereafter, the brake signal or input force moves the pistons 62 and 90 in bore 34 to develop a brake pressure in chambers 64 and 96, respectively. The brake pressure developed in chamber 96 is transmitted through conduit 43 to the front brakes 24, while the brake pressure developed in chamber 64 is simultaneously transmitted to the rear brakes 26 through conduit 41 and to brake pressure chamber 110 in the second bore 38. The brake pressure in chamber 110 acts on the end surface of land 112 and linearly moves the spool valve or sleeve 98 in opposition to spring 156. Initial movement of spool valve or sleeve 98 moves land 118 past second passage 46 to provide communication between the second bore 38 and the second chamber 66. Further movement of the spool valve or sleeve 98 causes a fluid pressure to build up as the flow is restricted between land surface 121 and groove 122 in housing 12. This fluid pressure is communicated through passage 46 into the second chamber 66 where it acts on end 74 of piston 62 to provide a power assist in the pressurization of fluid in chamber 62.

When a predetermined brake pressure develops in chamber 64, end 105 of spool valve or sleeve 98 moves into engagement with stop 107 in housing 12. During this situation, land 121 moves past annular groove 122 to interrupt fluid communication between passage 134 and return 56. Thereafter, the fluid pressure is required to overcome relief valve 132 before flow occurs between passage 128 and return 56 through passage 136. The relief valve 132 is selected such that the diversion of fluid from pump 16 to the brake system does not impair the operation of a power assist to the steering system.

If at the same time, the operator desires to turn the wheels of the vehicle, operator rotary input is applied to the steering wheel to turn the steering wheel and the steering shaft 32 to a new position. Rotation of shaft 32 relative to sleeve 98 causes a flow restriction to occur between the inlet passge 54 and slots 179 and 180 or slots 182 and 184 depending upon whether a right or left-hand turn is desired. For illustrative purposes, assume a right-hand turn is desired. In this situation shaft 32 rotates in a clockwise manner causing the flow from inlet passage to slots 182 and 184 to be restricted, while allowing free flow through slots 179 and 180 to the return passage 56. Restriction of the flow into slots 182 and 184 causes a pressure to build up therein which is transmitted through radial bore 124 to the first flow path or steering passage 58. The fluid pressure in steering passage 58 is transmitted to through passage 59 and into chamber 187. The fluid pressure in chamber 187 creates a pressure differential across piston 188 since chamber 189 is connected to the return passage 56 through passages 61 and 60, slots 179 and 180, radial bore 126 and axial passage 128. This pressure differential acts on piston 188 and provides a force for moving the rack 196 toward chamber 189. Movement of the rack 196 which is transmitted into pinion 166 as rotative movement through the meshing of teeth 192 and 194 is carried into spool valve or sleeve 98 through the engagement of keys 204 and 206 to rotate sleeve 98 to its original position relative to shaft 32. As the sleeve 98 rotates to this original position the restrictive flow relationship between the slots 182 and 184 and the inlet passage 54 is gradually reduced. Once the rotation of sleeve 98 is the same as the original rotation of shaft 32, the restrictive flow relationship is eliminated because slots 179, 180, 182 and 184 will again be aligned with radial bores 124, 126, 138 and 140 so that half of the fluid from inlet passage 54 flows in slots 179 and 180 and half of the fluid flows in slots 182 and 184, just as it did before the rotation of shaft 32. Since the restrictive flow relationship is eliminated, the pressure differential is also eliminated, and the rack is maintained in its new position corresponding to the new position of the steering wheel.

When the brake signal or input force on pedal 30 is reduced, the brake pressure in chamber 64 is correspondingly reduced. With a reduction in the brake pressure in chamber 110, spring 156 moves spool valve or sleeve 98 toward chamber 110 to provide restricted communication between passage 46 and return 56 through groove 146 and thereby reduce the fluid pressure providing the power assist in chamber 66.

Upon termination of the brake signal or input force to pedal 30, the brake pressure in chamber 64 is sequentially reduced to reservoir pressure. Thereafter spring 156 moves the spool valve or sleeve 98 against stop 99 to completely open communications between passage 46 and return 56.

Until shaft 32 is rotated to another position, slots 182 and 184 are positioned in bore 142 to provide free communication therethrough for fluid between inlet passage 54 and return passage 56. As long as the restrictive flow condition is reduced, the pressure differential across piston 188 is eliminated. The fluid from pump 16 freely circulates by flowing in conduit 211, passage 54, slots 179, 180, 182, and 184, radial bore 126, axial passage 128, radial bore 134, return passage 56 and return conduit 212 before being communicated to a reservoir in pump 16 until needed to provide a power assist in the operation of either the brake system or steering system of the vehicle.

Figure 9:
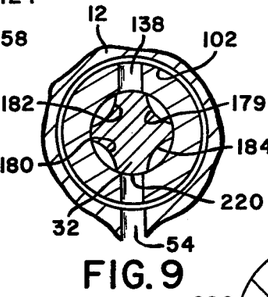
FIG. 9 is a sectional view of an input steering shaft for use in a closed center system fluid distribution arrangement; in a closed center system fluid distribution arrangement.

While the embodiment shown in FIG. 1 illustrates an open center concept wherein fluid is continually flowing through the control mechanism 14, a closed center flow mechanism could be created through the addition of a charging valve and accumulator in supply conduit 211 and a change in position of slots 179, 180, 182 and 184 with respect to radial bore 138 as shown in FIG. 9 and the addition of a groove in land 118. In such an arrangement, the fluid under pressure in the accumulator is available in input passage 54. However, flow through radial bore 138 is prevented by surface 220.

Thereafter when brake pressure in chamber 110 moves sleeve 98, the communication between passage 46 and return 56 is interrupted and is opened between the groove in land 118 and inlet passage 54. The stored fluid under pressure is communicated into chamber 66 and acts on end 74 of piston 62 to provide a power assist in pressurizing the fluid in chamber 64.

Similarly when a steering signal from the operator rotates shaft 32 to a new position, one set of the slots 179 and 180 or 182 and 184 is opened to radial bore 138 to allow a metered flow of fluid under pressure to either the first flow path or steering passage 58 or the second flow path or steering passage 60. Thereafter, the fluid under pressure acts on piston 188 to provide a power assist in moving rack 196. As described above with respect to the open center system, pinion 166 carries the movement of rack 196 back into the sleeve 98 as rotary motion to modify the metering relationship between surface 220 and radial bore 138 so that the rack 196 is maintained in a new position corresponding to the new position of shaft 32.

Figure 10:
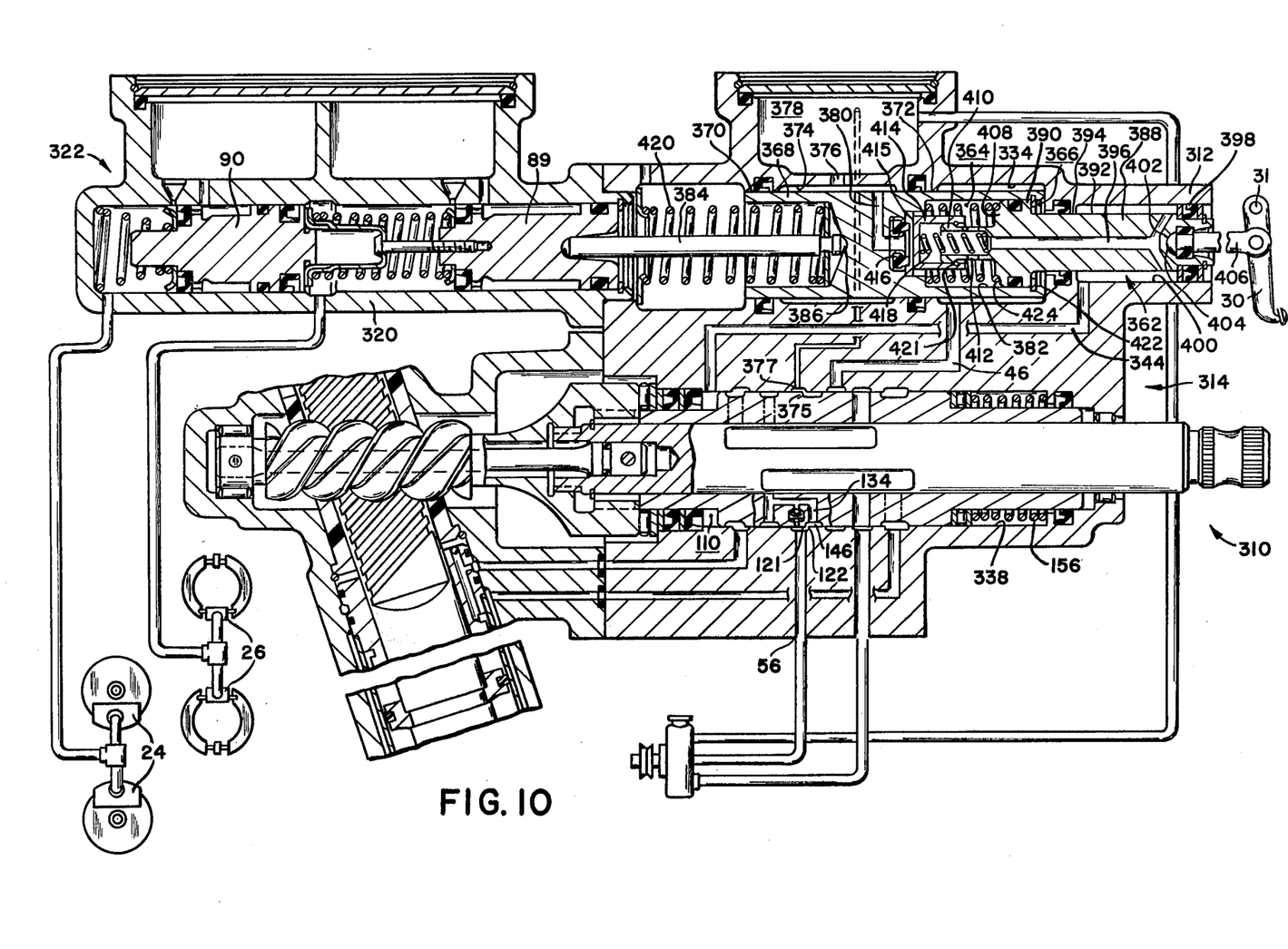
FIG. 10 is a schematic illustration of separate operational fluids for a brake and steering system, showing a sectional view of an integrated control made according to the teachings of this invention, for regulating the distribution of pressurized fluid to provide a power assist in the operation of the brake and steering system.

The embodiment 310 of the invention shown in FIG. 10 is adapted to be utilized when different operational fluids are used in the brake and steering systems. Where components in FIG. 10 are identical to those in FIG. 1, the same reference numerals are used to identify the component.

The embodiment 310 has a housing 312 for separating the control mechanism 314 from a master cylinder 320. The housing 312 has a first bore 334 and a second bore 338 located therein. The first bore 334 has an actuation piston means 362 located therein for separating an actuation pressure chamber 364 from a boost pressure chamber 366. The actuation pressure chamber 364 is connected to the brake pressure chamber 110 in the second bore 338 by a passage 344 while the boost pressure chamber is connected to groove 146 in the return flow path to return passage 56.

The actuation piston means 362 has a cylindrical body member 368 which is aligned in bore 334 between a first bearing surface 370 and a second bearing surface 372. A first groove 374 which is located in the housing 312 between the first and second bearing surfaces 370 and 372 is connected to a reservoir 378 by a compensator passage 376. The cylindrical body member 368 extends past bearing surface 372 into the boost pressure chamber 366. A passage 380 in the cylindrical body member 368 connects bore 382 with the reservoir 378 through groove 374. A push rod 384 located in socket 386 connects the cylindrical body member 368 with the first piston 89 in the master cylinder 320 of the brake system 322.

An actuation piston 388 has a sealing surface 390 located in bore 382 to separate the actuation pressure chamber 364 from the boost pressure chamber 366 and a guide surface 392 retained in bearing 394. A seal 398 attached to end of piston 388 prevents fluid communication between distribution groove 400 and the surrounding environment. The groove 400 is connected to brake pressure chamber 110 in the second bore 338.

The actuation piston 388 has a socket 402 on the rear surface thereof for retaining spherical head 404 of push rod or linkage 406 to connect the brake pedal 30 with the actuation piston 388.

The actuation piston 388 has a tube 410 extending from end 408 thereof to connect passage 396 with actuation chamber 364. The tube 410 has a series of openings 412 to aid in the communication of fluid from the actuation chamber 364 into passage 396.

A cap 414 which surrounds tube 410 is urged toward seal 416 that surrounds passage 380 by a spring 418. A retainer ring 421 prevents spring 418 from separating the cap 414 from the tube 410.

A first return spring 420 which surrounds push rod 384 urges cylindrical body member 368 against stop 422 to return the actuation piston means 362 to the rest position shown in FIG. 10.

A second return spring 424 located in actuation chamber 364 acts on the actuation piston 388 and moves cap 414 away from seat 416 to provide free communication between reservoir 378 and the actuation chamber 364.

All the components in the second bore 338 are identical to and function in the same manner as those in FIG. 1 and therefore are not redescribed.

The integrated brake and steering system 310 shown in FIG. 10 operates in the following manner.

When an operator desires to effect a brake application, an input force is applied to brake pedal 30. This input force is transmitted through push rod or brake linkage 406 to the actuation piston 388.

Initial movement of actuation piston 388 overcomes spring 424 and allows face 415 on end cap 414 to seat on seal 416 and isolate actuation chamber 364 from reservoir 378. Further movement of piston 388 by push rod or linkage 406 causes a brake pressure to develop in chamber 364. This brake pressure acts on cylindrical body member 368 and overcome spring 420 to provide pistons 89 and 90 in master cylinder 322 with an actuation force through push rod 384. At the same time this brake actuation pressure is communicated to brake pressure chamber 110 in the second bore 338 through passages 396 and 344. The brake pressure in chamber 110 acts on spool valve or sleeve 98 to interrupt communications between reservoir 378 and passage 377 and thereafter restrict the flow between return passage 56 and radial bore 134. The restricted flow to the return passage 56 causes a pressure to build up in the fluid from pump 16. Further movement of the spool valve or sleeve 98 by the brake pressure opens communication between passage 46 and groove 146 to allow the pressurized fluid to be communicated to boost pressure chamber 366. The fluid pressure in the boost chamber 366 acts on the cylindrical body member 368 and the back side of cylindrical surface 390 to provide an assist in moving the first and second pistons 89 and 90 that produce an operational brake fluid pressure for actuating the front and rear wheel brakes 24 and 26.

The control mechanism 314 in FIG. 10 responds to a steering signal applied to shaft 32 in the exact same manner as in FIG. 1.

With a reduction in the brake signal applied to brake pedal 30, spring 424 acts on end 408 and moves actuation piston 388 toward boost pressure chamber 366 to reduce the brake actuation pressure in chamber 364. With a reduction in the brake actuation pressure, spring 156 moves spool valve or sleeve 98 toward chamber 110 to reduce the restriction between land 121 and surface 122 to thereby reduce the fluid pressure in the boost fluid.

With a termination in the brake signal, spring 424 further moves the actuation piston 388 toward the boost pressure chamber 366 and eventually face 415 on cap 414 moves away from seat 416 to communicate the actuation chamber 364 to reservoir 378. At the same time spring 156 moves land 375 past passage 377 to provide communication between passage 344 and reservoir 378 to vent the boost chamber 366 to atmosphere and terminate the assist to movement of the actuation chamber.

I claim:

1. In a vehicle having a brake system and a steering system, an integrated control mechanism for controlling the communication of pressurized fluid from a source to provide a power assist in the operation of said brake and steering systems, said integrated control mechanism comprising:

a housing having first and second bores therein;
    piston means located in said first bore and cooperating with said housing to establish a first pressure chamber adjacent one end of said piston means and a second pressure chamber adjacent the other end of the piston means, said first pressure chamber being connected to said brake system;
    sleeve means located in said second bore and cooperating with said housing to establish a brake actuation chamber, first and second flow paths between the source of pressurized fluid and a pressure piston in the steering gear of the steering system, and a third flow path between the source of pressurized fluid and said second pressure chamber, said brake actuation chamber being connected to said first pressure chamber by a fourth flow path;
    brake linkage means responsive to an operator brake signal for moving said piston means to develop a brake pressure in said first pressure chamber when a brake application is effected, said sleeve means moving linearly in said second bore in response to brake pressure in said brake actuation chamber to allow communication of pressurized fluid from said source to said second pressure chamber, said pressurized fluid in said chamber acting on said piston means to provide a power assist during the duration of said operator brake signal; and
    steering linkage means rotating with respect to said sleeve means in response to an operator steering signal for restricting the flow of pressurized fluid from said source through one of said first and second flow paths, said restricted flow causing a pressure differential to develop across said pressure piston in the steering gear, said pressure piston moving in response to said pressure differential to provide a power assist in the operation of said steering system, the movement of said power piston being transmitted into rotation of said sleeve means to proportionally reduce the restrictive flow condition between the first and second flow paths as said steering gear moves to a position corresponding to said operator steering signal, said sleeve means eliminating said restricted flow condition and eliminating said pressure differential to maintain said steering gear in said corresponding position when the rotation of said sleeve means corresponds to the rotation of said steering linkage means.

2. The integrated control mechanism, as recited in claim 1, further including:

a resilient member located in said second bore for opposing the linear movement of said sleeve means by said brake pressure and for urging said sleeve toward the brake actuation chamber in the absence of an operator brake signal to prevent communication of pressurized fluid from said source to the second pressure chamber through said third flow path.

3. The integrated control mechanism, as recited in claim 2, wherein said housing further includes:

a reservoir connected to said first bore for storing a quantity of fluid to provide compensatory fluid to sustain the optimum operation of the brake system; and
    a relief flow path providing a return passage for the pressurized fluid from the second bore.

4. The integrated control mechanism, as recited in claim 3, wherein said steering linkage means includes:
an input shaft concentrically located in said sleeve means, said shaft having a first series of axial slots through which the source of pressurized fluid is communicated to the first flow path and the return path connected to said source of pressurized fluid and a second series of axial slots through which the source of pressurized fluid is communicated to the second flow path and the return passage connected to said source of pressurized fluid, said first and second series of axial slots being staggered to permit continual communication of pressurized fluid from said source during axial movement of said sleeve means by brake pressure in the brake actuation chamber.

5. The integrated control mechanism, as recited in claim 4, wherein said steering linkage means further includes:
a torsion bar fixed to said input shaft;
a pinion member having a first end fixed to said torsion bar and a second end connected to said sleeve means, said pinion member engaging a rack connected to said wall in the steering gear, said wall moving said rack to thereby rotate said pinion member during the duration of said operator steering signal, said second end of the pinion member transmitting the rotation of the pinion member into said sleeve means to sustain the relationship between the first and second series of slots on the input shaft and the first and second flow path during the operator steering signal.

6. The integrated control mechanism, as recited in claim 5, wherein said sleeve means includes:
a cylindrical member having a series of radial passages for connecting the source of pressurized fluid with the first and second slots in the input shaft, the first and second slots with the return passage, and the first and second flow paths in the housing.

7. The integrated control mechanism, as recited in claim 6, wherein said cylindrical member of the sleeve means further includes:
a series of lands on the peripheral surface of said cylindrical member, said series of lands controlling the distribution of pressurized fluid from said source into said series of radial first and second axial slots on said input shaft for distribution to the first and second flow paths and the return flow path and into the third flow path for distribution to the second pressure chamber upon axial movement of the sleeve means by a brake pressure.

8. The integrated control mechanism, as recited in claim 7, further including:
a retainer surrounding said sleeve means and engageable with said resilient means; and
a first bearing located between said retainer and a shoulder on said sleeve means, said bearing allowing said sleeve means to freely rotate during axial movement thereof by said brake pressure.

9. The integrated control mechanism, as recited in claim 8, wherein said housing further includes:
an annular projection which retains a second bearing that surrounds said input shaft, said sleeve means engaging said annular projection to limit the axial movement of the sleeve means and prevent the diversion of more than a predetermined quantity of pressurized fluid from said source to said second pressure chamber to thereby assure a power assist in the operation of the steering gear should the operator brake and steering signals occur simultaneously.

10. In a vehicle having a brake system and a steering system, a control mechanism for regulating the communication of a source of pressurized fluid to the brake system and the steering system corresponding to an operator input signals, said control mechanism comprising:
a housing having a first bore and a second bore therein, a reservoir for storing a quantity of fluid, a first and second passages connecting said first bore with said second bore, a third and fourth passage for connecting said second bore with the source of pressurized fluid, a fifth passage for connecting said second bore to one side of a power steering piston, and a sixth passage for connecting said second bore to another side of the power steering piston;
piston means located in said first bore and cooperating with said housing to establish a first chamber adjacent one end of said piston means and a second chamber adjacent the other end of said piston means, said first passage connecting said first chamber with said second bore, said second passage connecting said second chamber with said second bore;
spool valve means located in said second bore and cooperating with said housing to establish a brake actuation chamber adjacent said first passage, said spool valve means having a first land for separating said brake actuation chamber from said fifth passage in said housing, a second land for separating said fifth passage from said fourth passage in said housing, a third land for separating said fourth passage from said second passage; a fourth land for separating said second passage from said third passage, and a fifth land for separating said third passage from said sixth passage, a first radial bore adjacent said first land for connecting said fifth passage to the interior of said spool valve means, a second radial bore adjacent said second land for connecting said fourth passage to the interior of said spool valve means, a third radial bore adjacent said fourth land for connecting said third passage to the interior of said spool valve means, and a fourth radial bore adjacent said fifth land for connecting said sixth passage with the interior of said spool valve means;
brake linkage means responsive to an operator brake signal for moving said piston means to develop a brake actuation pressure in said first chamber when a brake application is effected, said brake actuation pressure being communicated to said brake actuation chamber for moving said spool valve means to open communication between said second and third passages and direct a portion of the pressurized fluid from said source into said second chamber, said pressurized fluid in said second chamber acting on the other end of said piston means to provide an assist to the operator brake signal in moving said piston means; and
steering linkage means responsive to an operator steering signal for restricting the flow of pressurized fluid through one of said fifth and sixth passages and causing a pressure differential to develop across and move the power steering piston, the movement of the power steering piston being communicated to said spool valve means to maintain the restrictive flow of the pressurized fluid from the source between the third passage and the fourth passage for the duration of the operator steering signal.

11. The control mechanism, as recited in claim 10, further including:
a resilient member located in said second bore for opposing the movement of said spool valve means by the brake actuation pressure to provide for proportional communication of the pressurized fluid from said source to said second chamber.

12. The control mechanism, as recited in claim 11, further including:
stop means connected to said housing for limiting the movement of said spool valve means by the brake actuation pressure to prevent the complete diversion of the pressurized fluid from said source to the second chamber during an operator brake signal and assure that a sufficient pressurized fluid is available to develop a pressure differential across the power steering piston and provide an assist in the operation of the steering system.

13. In a vehicle having a brake system and a steering system, a control means for providing an operational assist to the brake system and the steering system from a source of pressurized fluid in response to corresponding independent operator brake and operator steering inputs, said control means comprising:
a housing having first and second bores therein;
piston means located in said first bore and cooperating with said housing to separate a first chamber from a second chamber;
spool valve means located in said second bore and cooperating with said housing to establish a brake actuation chamber in the second bore, said spool valve means having a series of lands and passages for directing the communication of pressurized fluid from said source to the second chamber and to a rack member in the steering system;
brake linkage means responsive to an operator brake signal for moving said piston means and developing a brake actuation signal, said brake actuation signal being communicated to said brake actuation chamber for moving said spool valve and allowing proportional communication of pressurized fluid from said source to said second chamber, said pressurized fluid in said second chamber acting on said piston means to provide a power assist to the operator brake signal; and
steering linkage means rotating relative to said spool valve means in response to an operator steering signal to allow flow of pressurized fluid from said source to create a pressure differential across the rack member, said pressure differential moving the rack to provide a power assist in the operation of the steering system, said movement of the rack member being transmitted into rotation of said spool valve means to proportionally reduce the restrictive flow condition as said rack member moves to a position corresponding to said operator steering signal, said spool valve means eliminating the restricted flow condition and eliminating said pressure differential to maintain said rack member in said corresponding position when the rotation of said spool valve means corresponds to the rotation of said steering linkage means.

14. The control means, as recited in claim 13, wherein said spool valve moves along an axial path in response to the operator brake signal and along an arcuate path in response to the operator steering signal.

15. In a vehicle having fluid power assisted braking and steering systems, a control mechanism for controlling fluid communication from a fluid pressure source to the brake and steering systems in response to independent brake and steering input signals, said control mechanism comprising:
a housing having a bore therethrough, said bore being connected to said fluid pressure source, said brake system, and said steering system;
valve means operable in said bore for controlling fluid communication to said brake and steering systems, said valve means having inner and outer coaxial members, one of said inner and outer members having a series of lands and passages which cooperate with the wall of said bore to connect said fluid pressure source with said brake system, the other of said inner and outer coaxial members having a series of slots thereon, said slots and said passages cooperating to define a connection through which said fluid pressure source communicates with said steering system;
means responsive to said independent brake input signal for effecting translatory movement of one of said inner and outer coaxial members to supply said brake system with fluid pressure corresponding to said brake input signal; and
means responsive to said independent steering signal for effecting rotation of the other of said inner and outer coaxial members to supply said steering system with fluid pressure corresponding to said steering input signal.

16. The invention of claim 15:
wherein said inner member is rotated by a vehicle steering shaft which rotates in response to said steering input signal and said outer member is moved axially within said bore in response to said brake input signal.

17. The invention of claim 16:
wherein said outer member is actuated by fluid pressure.

18. The invention of claim 15:
and means for communicating fluid pressure to an interface between an outer circumferential surface of said outer member and the wall of the bore and means for communicating said interface to said braking system, and means carried on the wall of the bore and on the outer circumferential surface of said outer member to meter fluid communication to said braking system.

19. The invention of claim 15:
and means for communicating fluid pressure to an interface between the inner and outer members and from said interface to said steering system, and means carried by said inner and outer members for metering fluid communication to said steering system upon relative rotation between said members.

20. The invention of claim 19: and
means for communicating fluid pressure to the interface between the outer circumferential surface of said outer member and the wall of the bore and means for communicating said interface to said braking system, and means carried on the wall of the bore and on the outer circumferential surface of said outer member to meter fluid communication to said braking system.

21. In a vehicle having a brake system and a steering system, an integrated control mechanism for controlling the communication of pressurized fluid from a source to provide a power assist in the operation of said brake and steering systems, said integrated control mechanism comprising:

a housing having first and second bores therein;

piston means located in said first bore and cooperating with said housing to establish a first pressure chamber adjacent one end of said piston means and a second pressure chamber adjacent the other end of the piston means, said first pressure chamber being connected to said brake system;

sleeve means located in said second bore and cooperating with said housing to establish a brake actuation chamber, first and second flow paths between the source of pressurized fluid and a pressure piston associated with a rack in the gear of the steering system, and a third flow path between the source of pressurized fluid and said second pressure chamber, said brake actuation chamber being connected to said first pressure chamber by a fourth flow path;

brake linkage means responsive to an operator brake signal for moving said piston means to develop a brake pressure in said first pressure chamber when a brake application is effected, said sleeve means moving linearly in said second bore in response to brake pressure in said brake actuation chamber to allow communication of pressurized fluid from said source to said second pressure chamber, said pressurized fluid in said second chamber acting on said piston means to provide a power assist during the duration of said operator brake signal; and steering linkage means rotating with respect to said sleeve means in response to an operator steering signal to restrict the flow of pressurized fluid from said source through one of said first and second flow paths, said restricted flow causing a pressure differential to develop across said pressure piston, said pressure piston responding to said pressure differential by moving said rack to provide a power assist in the operation of said steering system, said rack rotating a pinion and the rotation of said pinion being transmitted into rotation of said sleeve means, said sleeve means rotating to proportionally reduce the restrictive flow condition between the first and second flow paths as said rack moves to a position corresponding to said operator steering signal, said sleeve means eliminating said restricted flow condition and eliminating said pressure differential to maintain said rack in said corresponding position when the rotation of said sleeve means corresponds to the rotation of said steering linkage means.

22. The integrated control mechanism, as recited in claim 21, further including:

a resilient member located in said second bore for opposing the linear movement of said sleeve means by said brake pressure and for urging said sleeve toward the brake actuation chamber in the absence of an operator brake signal to prevent communication of pressurized fluid from said source to the second pressure chamber through said third flow path.

23. The integrated control mechanism, as recited in claim 22, wherein said housing further includes:

a reservoir connected to said first bore for storing a quantity of fluid to provide compensatory fluid to sustain the optimum operation of the brake system; and a relief flow path providing a return passage for the pressurized fluid from the second bore.

24. The integrated control mechanism, as recited in claim 23, wherein said steering linkage means includes:

an input shaft concentrically located in said sleeve means, said shaft having a first series of axial slots through which the source of pressurized fluid is communicated to the first flow path and the return path connected to said source of pressurized fluid and a second series of axial slots through which the source of pressurized fluid is communicated to the second flow path and the return passage connected to said source of pressurized fluid, said first and second series of axial slots being staggered to permit continual communication of pressurized fluid from said source during axial movement of said sleeve means by brake pressure in the brake actuation chamber.

25. The integrated control mechanism, as recited in claim 24, wherein said steering linkage means further includes:

a torsion bar fixed to said input shaft;

a pinion member having a first end fixed to said torsion bar and a second end connected to said sleeve means, said pinion member engaging a rack connected to said wall in the steering gear, said wall moving said rack to thereby rotate said pinion member during the duration of said operator steering signal, said second end of the pinion member transmitting the rotation of the pinion member into said sleeve means to sustain the relationship between the first and second series of slots on the input shaft and the first and second flow path during the operator steering signal.

26. The integrated control mechanism, as recited in claim 25, wherein said sleeve means includes:

a cylindrical member having a series of radial passages for connecting the source of pressurized fluid with the first and second slots in the input shaft, the first and second slots with the return passage, and the first and second flow paths in the housing.

27. The integrated control mechansim, as recited in claim 26, wherein said cylindrical member of the sleeve means further includes:

a series of lands on the peripheral surface of said cylindrical member, said series of lands controlling the distribution of pressurized fluid from said source into said series of radial first and second axial slots on said input shaft for distribution to the first and second flow paths and the return flow path and into the third flow path for distribution to the second pressure chamber upon axial movement of the sleeve means by a brake pressure.

28. The integrated control mechanism, as recited in claim 27, further including:

a retainer surrounding said sleeve means and engageable with said resilient means; and a first bearing located between said retainer and a shoulder on said sleeve means, said bearing allowing said sleeve means to freely rotate during axial movement thereof by said brake pressure.

29. The integrated control mechanism, as recited in claim 28, wherein said housing further includes:

an annular projection which retains a second bearing that surrounds said input shaft, said sleeve means engaging said annular projection to limit the axial movement of the sleeve means and prevent the diversion of more than a predetermined quantity of pressurized fluid from said source to said second pressure chamber to thereby assure a power assist in the operation of the steering gear should the operator brake and steering signals occur simultaneously.

* * * * *